(No Model.) 3 Sheets—Sheet 1.
H. E. MILLER.
MACHINE FOR MOLDING ARTICLES FROM PLASTIC MATERIALS.
No. 534,446. Patented Feb. 19, 1895.

WITNESSES:
Ed. D. Miller.
R. A. Porteous

INVENTOR
Horace E. Miller,
BY
Chas. O. Gill
ATTORNEY.

(No Model.)  3 Sheets—Sheet 2.

H. E. MILLER.
MACHINE FOR MOLDING ARTICLES FROM PLASTIC MATERIALS.

No. 534,446. Patented Feb. 19, 1895.

WITNESSES:
Ed. D. Miller.
R. A. Porteous

INVENTOR
Horace E. Miller,
BY
Chas. B. Gill
ATTORNEY.

(No Model.) 3 Sheets—Sheet 3.

H. E. MILLER.

MACHINE FOR MOLDING ARTICLES FROM PLASTIC MATERIALS.

No. 534,446. Patented Feb. 19, 1895.

WITNESSES:
Ed. D. Miller.
R. A. Porteous

INVENTOR
Horace E. Miller,
BY
Chas. O. Gill
ATTORNEY.

UNITED STATES PATENT OFFICE.

HORACE E. MILLER, OF NEWARK, NEW JERSEY, ASSIGNOR TO THE CELLULOID COMPANY, OF SAME PLACE.

MACHINE FOR MOLDING ARTICLES FROM PLASTIC MATERIALS.

SPECIFICATION forming part of Letters Patent No. 534,446, dated February 19, 1895.

Application filed May 11, 1892. Renewed November 9, 1894. Serial No. 528,354. (No model.)

*To all whom it may concern:*

Be it known that I, HORACE E. MILLER, a citizen of the United States, and a resident of Newark, in the county of Essex and State of New Jersey, have invented certain new and useful Improvements in Machines for Molding Articles from Plastic Materials, of which the following is a specification.

The invention relates to an improved machine for molding articles from plastic material or other material adapted to be given form by pressure or heat and pressure, and said machine consists essentially of a frame having a top plate and bottom plate connected by bolts and having journaled between them a rotating multifold die-carrying dial-cylinder of appropriate construction, as hereinafter described, and provided with suitable operative mechanism.

Figure 1:
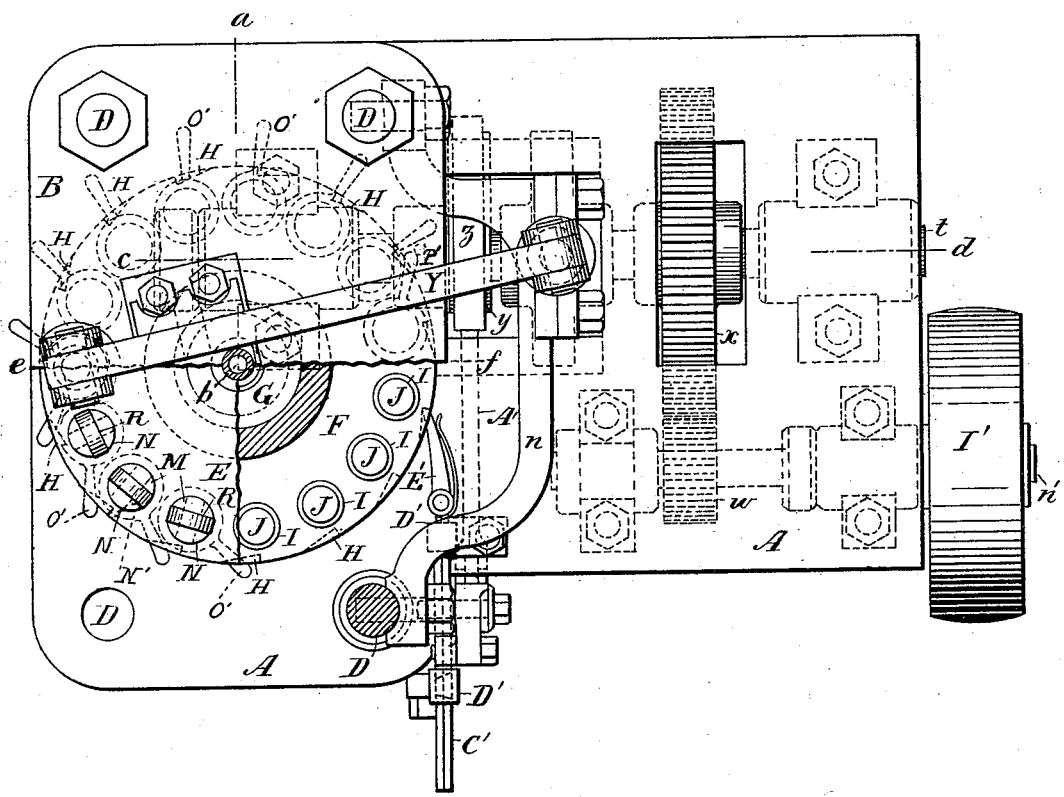
Figure 2:
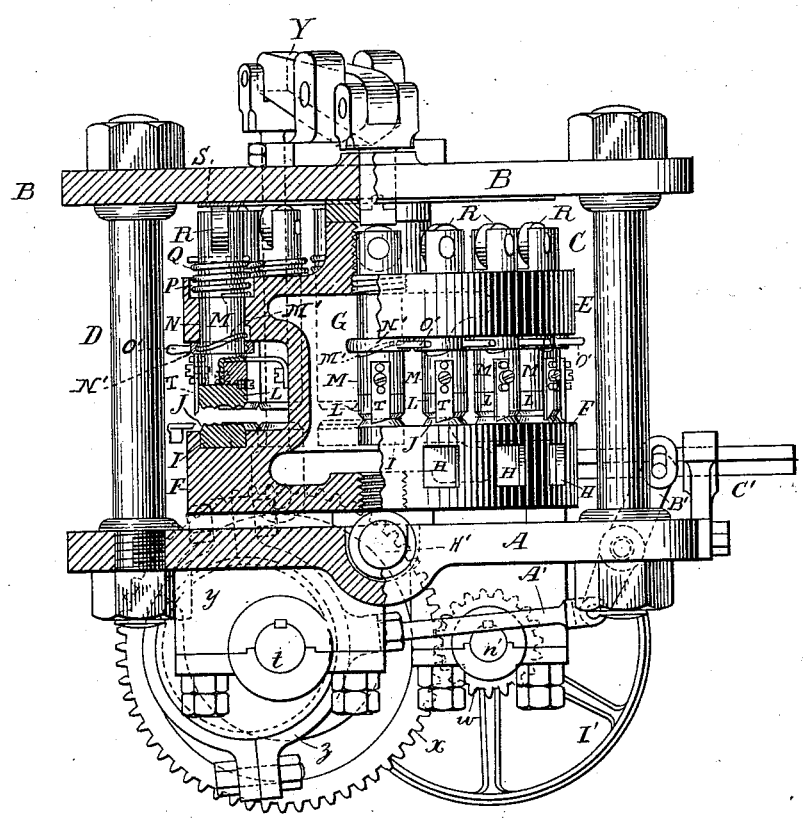
Figure 3:
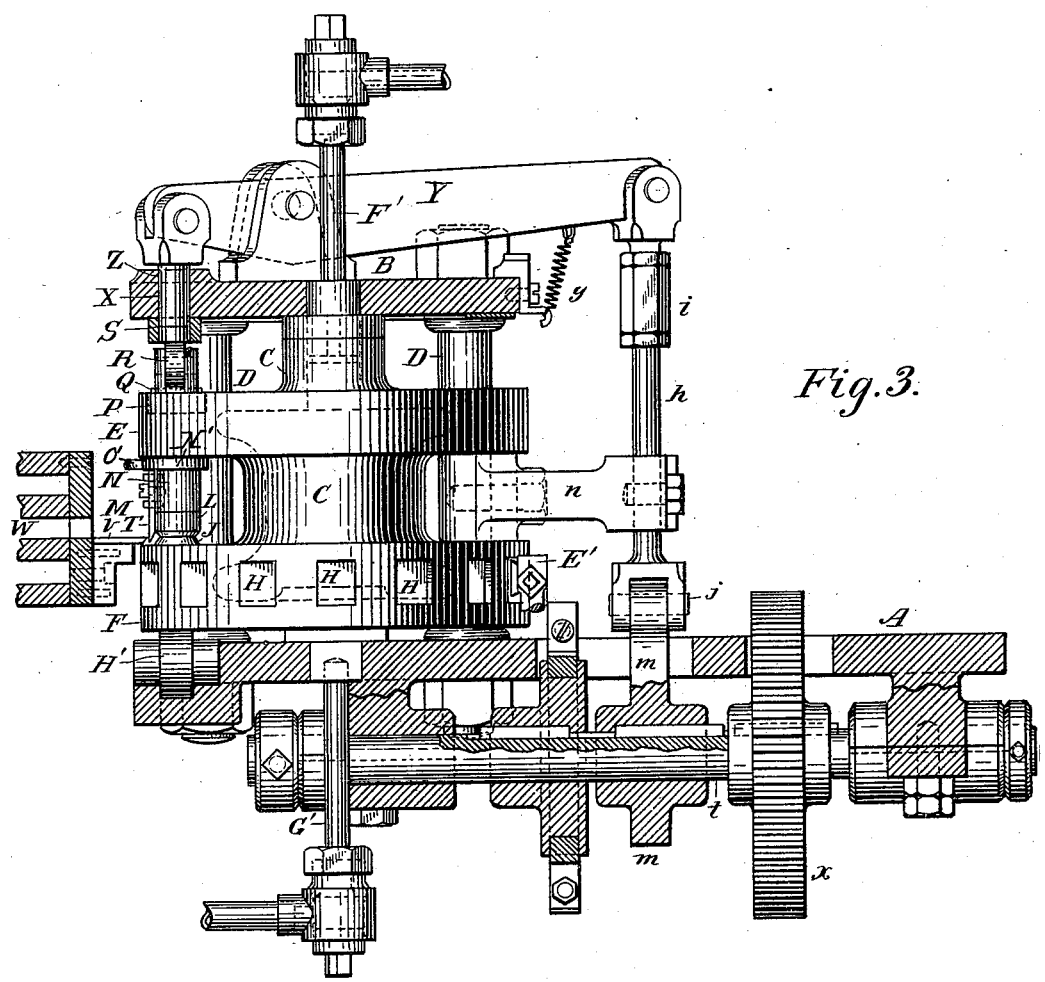

Referring to the accompanying drawings, which form a part of this application, Figure 1 is a top view of the machine, one-half of the top plate and one quarter of the upper plate of the die-carrying dial cylinder being removed for purposes of illustration. Fig. 2 is an elevation partly in section of the machine taken at the left hand end of Fig. 1, the section being on the dotted line *a—b* of said figure; and Fig. 3 is a side elevation, partly in section, of the machine as illustrated in Fig. 1, the section being on the dotted lines *c—d* and *e—f* of said figure.

In the drawings A designates the bottom or bed plate of the machine; B, the top plate of same, and C the the revoluble multifold die-carrying dial-cylinder, journaled between said plates, as more clearly illustrated in Fig. 3. The plates A, B, are connected and retained in proper relation to each other and to the cylinder C by tie bolts or rods D.

The dial-cylinder C is contracted circumferentially at its center, leaving annular projecting top and bottom plates or flanges, lettered E, F, respectively, and is made hollow in order to form an interior chamber G for the reception of hot or cold water, if it should be desired to heat or chill the material being treated during the process of manufacturing the articles.

The lower plate F of the dial-cylinder C has upon its periphery the series of equi-distant ratchet recesses H, and upon its upper surface a corresponding series of seats I to receive the lower sections J of the series of dies, in which the articles may be given form. The lower die sections J each have a matrix and are readily removable at will in order that sections adapted for new or different styles of articles may be substituted in their place when desired. The upper sections L of the dies are in line with the lower series of sections J, and are in the form of blocks having a proper matrix and secured by screws to the lower end of the plunger M, which are retained in the series of vertical apertures N formed in the top plate E of the dial-cylinder C. The upper portions of the apertures N are enlarged forming in each a seat P for the coiled spring Q which encompasses the upper portion of the plunger and exerts an upward tension thereon. Each of the plungers M is bifurcated at its upper end and incloses the roller R, which, when the plunger is in its upward position, travels on the circular tram-way S formed on or secured to the under surface of the plate B, as hereinafter described.

Upon the outer face of each of the plungers M may be secured a knife T, when the same shall appear necessary to the operation of the machine. The purpose of the knife T is to sever the material fed between the sections of the dies from the main strip thereof passing into the machine from over the feed table V, shown in Fig. 3. Where the machine is to be employed for molding buttons and similar small articles from celluloid or analogous material, it will be found convenient to feed the latter in the form of strips to the dies and to make use of the knife T for cutting a sufficient length of the material from the strip for the formation of the button, the feed of the material being timed with the action of the plunger to insure a proper quantity of the former being fed into the die prior to the cutting being effected. If desired the strips of celluloid or analogous material may be fed to the machine through a steam table W connected with the table V for the purpose of keeping the material warm and in condition to be rapidly and effectually treated by the dies at the proper time.

Each of the plungers M is provided with means for retaining it in its depressed position, with the plastic material between the meeting die sections J, L, and in the present instance, in order to accomplish the purpose, each of the plungers M is furnished with a spiral rib M' which engages a revoluble nut N' having a bearing against the lower surface of the plate or flange E and provided with a lever-handle O'. The springs Q normally sustain the plungers M in their upward position, with the die sections J, L, separated from each other, but when the plungers have been depressed and the die sections closed upon the plastic material it is necessary that they be maintained in this position a definite length of time during the rotation of the dial cylinder C, and hence upon the depression of each plunger M its nut N' will by means of the lever-handle O' be rotated upward on the spiral rib M' and against the lower face of the plate or flange E and thus lock the plunger in its depressed position, with the plastic material between the die sections J, L. The plungers M are depressed and the nuts N' turned to lock them in succession, and during the rotation of the dial cylinder C the die sections will thus remain closed under pressure until at a suitable point the nuts N' are in succession reversed and the springs Q allowed to elevate the plungers M to their normal position preparatory to the removal of the molded article and the introduction between the die sections of a further supply of the plastic material. The plungers M are depressed at the proper time and in succession by the plunger X secured in the short arm of the lever Y, and the dial-cylinder C is moved by a pawl and ratchet mechanism, both the latter mechanism and the lever Y receiving motion from the driving shaft through appropriate gearing, as hereinafter explained.

The lever Y is pivoted between lugs or standards secured upon or cast with the plate B; and its plunger X extends downward through and is adapted to have a vertical movement in an aperture Z in said plate. The long arm of the lever Y has a downward tension through the medium of the spring $g$, and carries in its end the vertical rod $h$ which is extensible at will by means of the internally threaded sleeve $i$ and incloses on an axle in its lower bifurcated end the roller $j$ in contact with the cam $m$. The rod $h$ passes through a guide in the frame $n$ secured at its ends to the tie-rods D, and imparts motion and power to the lever Y from the cam $m$ secured on the auxiliary shaft $t$, which receives motion from the main driving shaft $n'$ through the connecting gear wheels $w$, $x$.

Upon the auxiliary shaft $t$ and adjacent to the cam $m$ is secured the eccentric $y$ (Fig. 2) in the collar $z$ of which is secured one end of a rod A', the other end of same being pivoted in the lower arm of the rocking lever B', which is pivotally mounted, and has connected with its upper end the horizontal rod C'. The rod C' is adapted to have a horizontal reciprocating movement in the upper ends of the standards D', D' (Fig. 1) when actuated by the rocking lever B', and carries on its inner end the spring pawl E', the point of which impinges the periphery of the lower plate F of the cylinder C and when in motion acts in conjunction with the ratchet recesses H to impart an intermittent rotary motion to said cylinder.

Leading into and from the upper and lower central portions of the cylinder C are the inlet and escape pipes, lettered respectively F', G', which are provided for the admission and delivery of hot or cold water or other heating and cooling agents, for the purpose of heating or cooling the dies when the material being treated renders the same expedient or necessary.

The upper and lower central portions of the cylinder C are in the form of trunnions which enter correspondingly formed bearings in the plates A, B; and in the plate A may be seated a roller H' in position to serve as a support or the lower plate F of the dial-cylinder C directly in line with the point where power is applied to close the sections of the die, as shown in Figs. 2 and 3, the purpose of said roller H' being to sustain said portion of the plate F against the applied pressure of the plunger X.

In the operation of the machine power is applied to the band wheel I' keyed on the driving shaft $n'$, and the material from which the articles are to be manufactured is fed between the upper and lower sections of the dies as they successively come opposite to the feed table T. The motion of the shaft $n'$ is communicated to the shaft $t$ which causes the rotation of the cam $m$ and eccentric $y$, the former of which, as aforesaid, operates the rod $h$ to actuate the lever Y, and the latter (the eccentric) imparts through the rod A', lever B' and rod C', a reciprocating motion to the pawl E' which intermittently rotates the cylinder C.

The operative parts of the mechanism are so timed that between each movement of the dial cylinder C the lever Y will, through the plunger X, depress the plunger M which may at the time be opposite to the feed table T and the attendant will by turning the nut N' lock the said plunger in its depressed position. The plungers, one after another, are depressed and locked by the the nut N' and travel in this condition until the nuts N' are reversed, preferably at a point about opposite to the plunger X at which time the movement of the cylinder continuing, the springs Q will cause the plungers M to ascend, elevating them to their former position and so retaining them until they one after another again move beneath and are depressed by the plunger X and pass onward as before.

The reversal of the nuts N' to free the plungers M may be effected by hand or by a pin or arm P', shown by dotted lines in Fig. 1, extending downward from the plate B in position to meet the handles O' and turn the nuts as they pass a given point. After the nuts N' have been reversed and the springs Q have elevated the plungers M, the wheels R will move along the tramway S until the feeding point is again reached, when said plungers will in succession, as before, be depressed by the plunger X and locked by the nuts N'.

When the machine is in use the material to be given form is fed upon each die-section J as it comes opposite to the feed table T and just prior to the descent of the plunger M above it. Upon the descent of the plunger the material will be caught between and pressed into the matrices of the die sections, whereupon the succeeding rotary movement of the dial-cylinder will move the closed and locked die with its plunger M toward the pin or arm P' and thus the material in the die is pressed and given the form desired, according to the configuration of the matrices. The dies are successively supplied with the material being treated and then closed and moved onward under pressure until their plungers M successively ascend and separate the sections of the dies, at which time the molded articles may be removed therefrom. It will be thus observed that the dies are successively supplied with the material, closed and caused to travel under pressure a definite or sufficient length of time and are then opened to permit the withdrawal of the molded articles and the introduction of additional material to be given form during the succeeding revolution of the dial cylinder. This operation may be continued until the desired number of articles of a given form have been produced without interruption, after which the machine may be stopped and the die sections removed and substituted by sections of different form and construction adapted for the formation of a new line of articles. The particular nature and number of the dies will depend largely upon the character of the articles to be produced and hence I reserve the right to make use of such dies as may seem best adapted for the purposes of the invention.

I reserve the right to form such articles on the machine above described as may be appropriately manufactured thereon, and to employ such material in their production as may be given form under pressure or heat and pressure and prove most desirable. I reserve the right, also, to modify or alter the construction and form of the machine within the scope of my invention, as claimed herein, and to make such additions thereto as may be found desirable for the purpose of heating or cooling the dies during the rotation of the dial-cylinder should the nature of the material being treated render this advisable.

What I claim as my invention, and desire to secure by Letters Patent, is—

1. In a machine for molding articles under pressure, the automatic intermittently rotating dial provided around its lower portion with a series of die sections, and around its upper portion with a corresponding series of die-sections fitted in suitable guide ways to have a vertical movement independently of each other and arranged to close upon the material in the lower sections, both the upper and the lower series of die-sections being connected to the dial so as to be supported by and moved around by the dial in its rotation, in combination with means substantially as described for automatically depressing the upper die-sections in succession as they are brought under the action of said means, substantially as and for the purposes set forth.

2. In a machine for molding articles, the rotary dial supporting on its lower portion the lower part of a series of dies and upon its upper portion the upper part of said series of dies, the upper and the lower parts of said series of dies being moved with said dial in its rotation and said upper parts being connected with plungers having a tension upward and movable independently of each other, in combination with means substantially as described for automatically depressing said plungers in succession, and mechanical means substantially as described to retain the plungers in their depressed position to hold the material in the die under pressure while the dial is rotating, substantially as set forth.

3. In a machine for molding articles the hollow dial provided with ingress and egress pipes for the admission of a heating or cooling agent, combined with a series of dies consisting of a lower part stationary upon the lower portion of said cylinder and an upper part secured to vertically operating plungers arranged in apertures in the upper portion of said cylinder, means for depressing said plungers in succession, pawl and ratchet mechanism for giving the cylinder an intermittent rotary motion, and a means for retaining the plungers in their depressed position during a portion of the revolution of said cylinder; substantially as set forth.

4. In a machine for molding articles the dial journaled between plates and carrying a series of dies, one section of same being stationary and the other secured to vertically movable plungers arranged in apertures in said dial, combined with pawl and ratchet mechanism for imparting an intermittent rotary movement to said cylinder, means for retaining the plungers in their depressed position during a portion of the rotation of said dial, the lever Y, plunger X pivoted in the short arm of said lever, the rod hung in the long arm of said lever and means for actuating said rod, the parts being so timed that the plunger X will be depressed between the motions of the dial; substantially as set forth.

5. In a machine for molding articles the dial journaled between plates and carrying a series of dies, one section of same being stationary and the other secured to vertically movable plungers, arranged in apertures in said dial, combined with means for retaining the plungers in their depressed position during a portion of the revolution of said dial, the plunger X, lever Y, rod $h$, cam $m$, ratchet recesses on said cylinder and the horizontally moving pawl which engages said recesses and imparts to the dial cylinder an intermittent rotary motion; substantially as set forth.

6. The dial having the annular plates E, F, the latter holding the lower sections of the dies and the former being provided with apertures N, the plungers M in said apertures and the upper die sections secured to the lower ends of said plungers, combined with the rollers R plunger X, lever Y, rod $h$, cam $m$ and pawl and ratchet mechanism for imparting to the cylinder an intermittent rotary movement; substantially as set forth.

7. In a machine for molding articles under pressure the rotary dial carrying on its lower portion the lower section of a series of dies and upon its upper portion the upper section of said series of dies, one of said sections being secured to plungers and movable toward the other section, combined with means for depressing said plungers in succession and revoluble nuts carried by the said plungers to lock them in their depressed position; substantially as and for the purposes set forth.

8. In a machine for molding articles under pressure, the rotary dial carrying on its lower portion the lower section of a series of dies and upon its upper portion the upper section of said series of dies, one of said sections being secured to plungers and movable toward the other section, combined with means for depressing said plungers in succession, the revoluble lock nuts carried by said plungers and having handles, and the arm in the path of said handles to reverse said nuts as they pass a given point; substantially as and for the purposes set forth.

Signed at New York, in the county of New York and State of New York, this 9th day of May, A. D. 1892.

HORACE E. MILLER.

Witnesses:
   CHAS. C. GILL,
   ED. D. MILLER.